US011813994B2

(12) United States Patent
Blanco Schierling et al.

(10) Patent No.: US 11,813,994 B2
(45) Date of Patent: Nov. 14, 2023

(54) TEARDROP MINI CAMPER WITH BUILT-IN FOLD-DOWN BATHROOM

(71) Applicants: José Ignacio Blanco Schierling, Montevideo (UY); Noelia Fernandez Naida, Montevideo (UY)

(72) Inventors: José Ignacio Blanco Schierling, Montevideo (UY); Noelia Fernandez Naida, Montevideo (UY)

( * ) Notice: Subject to any disclaimer, the term of this patent is extended or adjusted under 35 U.S.C. 154(b) by 46 days.

(21) Appl. No.: 17/271,822

(22) PCT Filed: Aug. 28, 2019

(86) PCT No.: PCT/IB2019/057254
§ 371 (c)(1),
(2) Date: Feb. 26, 2021

(87) PCT Pub. No.: WO2020/044262
PCT Pub. Date: Mar. 5, 2020

(65) Prior Publication Data
US 2021/0323489 A1    Oct. 21, 2021

(30) Foreign Application Priority Data

Aug. 28, 2018  (UY) ........................................ U-4697

(51) Int. Cl.
*B60R 15/02*    (2006.01)
*B60P 3/36*    (2006.01)
(Continued)

(52) U.S. Cl.
CPC ................ *B60R 15/02* (2013.01); *B60P 3/36* (2013.01); *B60R 15/04* (2013.01); *B60J 5/02* (2013.01);
(Continued)

(58) Field of Classification Search
CPC ......... B60R 15/02; B60R 15/04; B60R 15/00; B60P 3/39
(Continued)

(56) References Cited

U.S. PATENT DOCUMENTS 3,705,743 A * 12/1972 Toomey .................... B60P 3/36
  296/168
3,838,880 A * 10/1974 Lefebvre .............. B62D 63/061
  296/26.02
(Continued)

FOREIGN PATENT DOCUMENTS

KR      100732386 B1    6/2007
WO    2015070287 A1    5/2015

OTHER PUBLICATIONS

International Search Report dated Dec. 11, 2019 re: Application No. PCT/IB2019/057254, pp. 1-3, citing: US 2017/0341562 A1, KR 100 732 386 B1, US 2007/0262611 A1 and WO 215/070287 A1.
(Continued)

*Primary Examiner* — Jason S Morrow
(74) *Attorney, Agent, or Firm* — CANTOR COLBURN LLP

(57) ABSTRACT

This utility model integrates into the standard structure of a teardrop mini camper, a folding front door that generates a bathroom module. Usually in these vehicles, a rear door is used for the kitchen space, so the mini camper described herein incorporates a door of similar characteristics in its front part, where the drawbar is placed.

5 Claims, 10 Drawing Sheets

(51) Int. Cl.
  *B60R 15/04* (2006.01)
  *B60J 5/02* (2006.01)
  *B60N 3/00* (2006.01)
  *B60R 5/02* (2006.01)
  *B62D 29/02* (2006.01)
  *B62D 29/04* (2006.01)

(52) U.S. Cl.
  CPC .................. *B60N 3/001* (2013.01); *B60R 5/02* (2013.01); *B62D 29/02* (2013.01); *B62D 29/043* (2013.01)

(58) Field of Classification Search
  USPC ........................................ 296/172, 173, 176
  See application file for complete search history.

(56) References Cited

U.S. PATENT DOCUMENTS

| | | | | |
|---|---|---|---|---|
| 4,072,337 | A * | 2/1978 | Barker | B60P 3/34 114/344 |
| 6,367,866 | B1 * | 4/2002 | Moore | B60P 3/1033 114/344 |
| 6,607,009 | B2 * | 8/2003 | Schoellhorn | B60R 15/00 137/355.16 |
| 7,258,390 | B2 | 8/2007 | Fisher et al. | |
| 7,488,030 | B2 * | 2/2009 | Nadeau | B60P 3/34 296/172 |
| 8,366,177 | B2 * | 2/2013 | Prusmack | B62D 63/062 296/24.32 |
| 10,457,189 | B1 * | 10/2019 | Gaw | B60P 3/36 |
| 11,345,270 | B2 * | 5/2022 | McGregor | B62D 63/061 |
| 11,345,271 | B2 * | 5/2022 | Mundt | B60N 3/002 |
| 2003/0030274 | A1 * | 2/2003 | Kennedy | B60R 15/04 285/145.5 |
| 2005/0225116 | A1 * | 10/2005 | Fisher | B60P 3/341 296/168 |
| 2007/0262611 | A1 | 11/2007 | Freeman et al. | |
| 2009/0014079 | A1 * | 1/2009 | Stegall | B60R 15/00 137/1 |
| 2017/0341562 | A1 | 11/2017 | Knight | |
| 2020/0385069 | A1 * | 12/2020 | Montesalvo | B60R 5/041 |
| 2021/0323489 | A1 * | 10/2021 | Blanco Schierling | B60J 5/02 |
| 2022/0006319 | A1 * | 1/2022 | Arahama | H02J 7/0063 |
| 2022/0250531 | A1 * | 8/2022 | Mundt | B60N 3/16 |

OTHER PUBLICATIONS

Written Opinion dated Dec. 11, 2019 re: Application No. PCT/IB2019/057254, pp. 1-4, citing: US 2017/0341562 A1, KR 100 732 386 B1, US 2007/0262611 A1 and WO 215/070287 A1.

* cited by examiner

TEARDROP MINI CAMPER WITH BUILT-IN FOLD-DOWN BATHROOM

TECHNICAL FIELD

This utility model is related to the field of campers or trailers for outdoor leisure activities. More specifically, it refers to 'teardrop' mini campers.

BRIEF DESCRIPTION OF THE UTILITY MODEL

In the field of mobile homes, caravans, motorhomes and camping vehicles, mini campers are the smallest vehicles within the entire range of options worldwide, with the limitation of not having all amenities included. In fact, its main disadvantage is the lack of a built-in bathroom. The utility model described herein solves this problem by creating a new option with all the amenities, in a size that many choose for its versatility when it comes to road trips, since there is no need for special towing vehicles.

Thus, the mini camper with built-in fold-down bathroom described herein involves a differentiating attribute regarding the currently available options for camping and 'caravanning,' since existing mini campers currently only have a bedroom and kitchen space due to their small size, while the camper described herein features a new option with all services included in a small-sized single unit.

BACKGROUND

Teardrop mini campers are widely known and they receive their name from their aerodynamic teardrop shape. Such format characterizes and defines this type of trailers, since their teardrop design allows them to be small-sized with an aerodynamic configuration facilitating their movement.

These campers became popular in the 1930s and are very different from mobile homes due to their format, weight, small size, and amenities. Their interior space consists of a small bedroom (with room for approximately a double mattress), and a kitchen space in the exterior back area.

They have always had the same characteristics in terms of space, without any further amenities.

Their interior space and facilities allow these campers to be used as a very small house where one may sleep and cook, although their most notable disadvantage is that they do not include a bathroom.

On the other hand, their lightness, together with their aerodynamic format, are their main virtues since almost any vehicle may tow them while minimally affecting fuel consumption.

For example, Document U.S. Pat. No. 7,258,390 discloses a camping trailer that is divided into a sleeping area, a kitchen area, and a bathroom area, where the bathroom area is located on an "A"-shaped frame structure in the front of the trailer. However, the trailer disclosed therein has the format of a conventional trailer, i.e., due to its dimensions, it does not meet the characteristics of a teardrop mini camper. On the other hand, its bathroom is not a fold-down bathroom, but it is integrated to the trailer's structure, its roof being the only moving part while all the rest remains in its place. This adds external volume to the trailer, so it is not possible to incorporate this format into a teardrop mini camper as its dimensions would not allow it.

DETAILED DESCRIPTION OF THE FIGURES

The main feature of teardrop mini campers is their small size, aerodynamic format, and thanks to these characteristics, they are quite light weighted compared to traditional trailers. Since their disclosure, the standard structure of a teardrop mini camper comprises a sleeping space and a folding rear door for the kitchen, although today there are even smaller models that have no kitchen and, on the other hand, exterior storage spaces have been incorporated in different places. There are standard and off-road models with infinite designs, but none of them integrates a fold-down bathroom in its structure.

This utility model integrates into the standard structure of a teardrop mini camper, a folding front door (1) that becomes a bathroom module. Usually, in these vehicles, a rear door is used for the kitchen space, so the mini camper described herein incorporates a door of similar characteristics in its front part, where the drawbar (19) is placed.

This bathroom module may be assembled in the same mini campers factory, both in wood—commonly used for their manufacture,—and in alternative materials such as fiberglass or iron structure and plates of various materials. The electrical and sanitary installation is the same as the one used in this type of vehicles, now adding a gray water tank under the chassis for the shower and sink waste.

Figure 10:
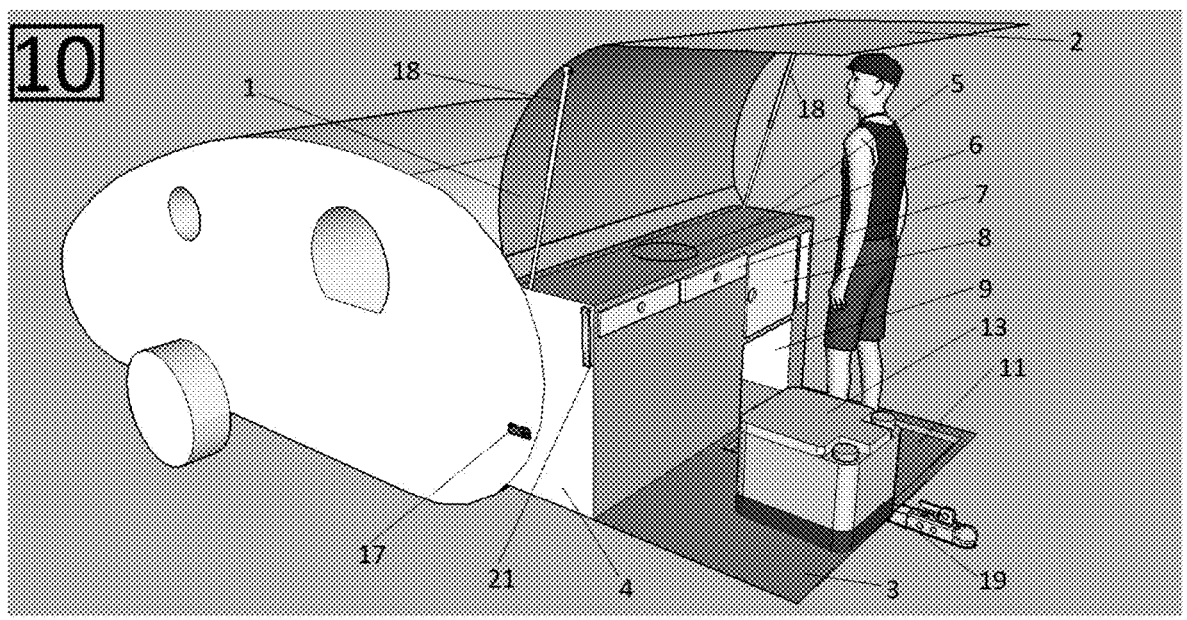
FIG. 10: same view as FIG. 9 adding the drawing of a person inside the bathroom so as to better illustrate the dimensions.
Figure 11:
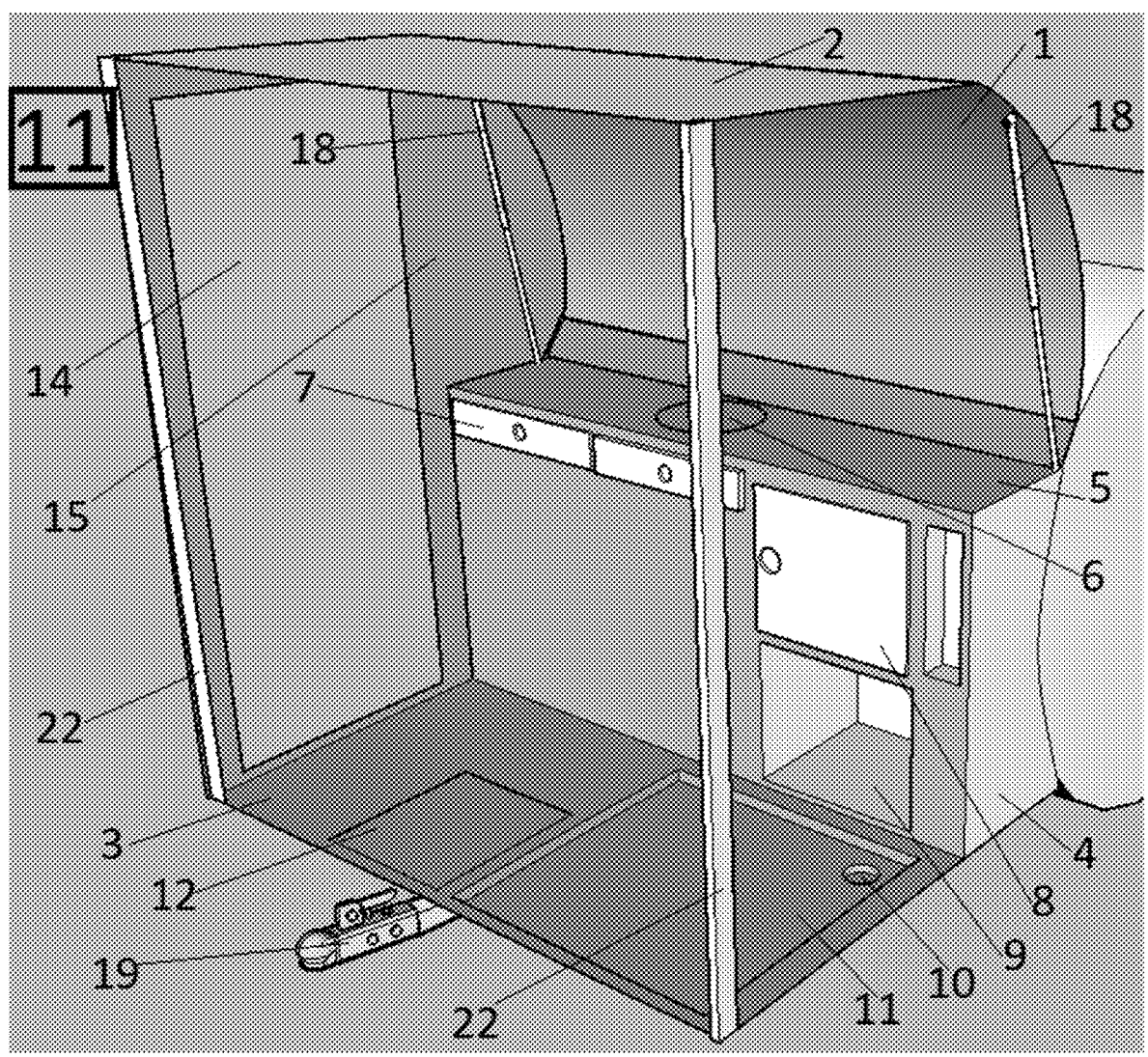
FIG. 11: view of the front door (1) completely unfolded, the bathroom roof (2) completely unfolded, the bathroom floor (3) completely unfolded, the under-counter cabinet (4) also completely unfolded, and thus the countertop (5), the sink (6), the storage drawer (7), the storage compartment (8), the storage space (9) for the chemical toilet (13), the shower drain (10), the shower space (11), the space to place (12) the chemical toilet (13) are visible; also being able to see the airplane fabric walls (15), the bathroom roof supports (22), the dampers (18) and the drawbar (19).
Figure 12:
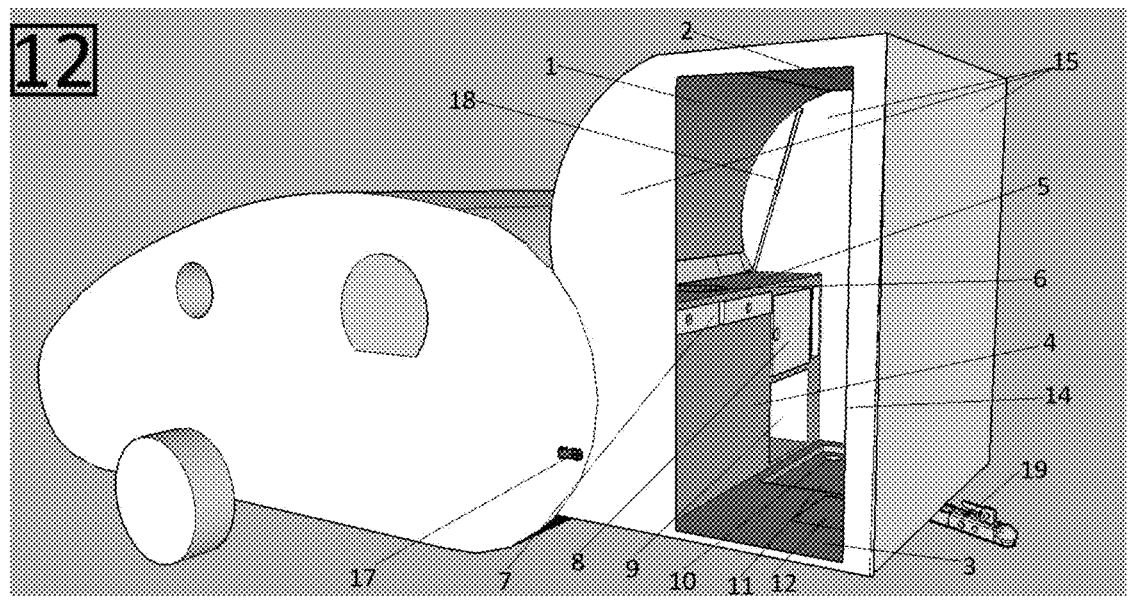
FIG. 12: exterior view of the bathroom fully unfolded, being able to see the front door (1), the bathroom roof (2), the bathroom floor (3), the under-counter cabinet (4), and thus the countertop (5), the sink (6), the storage drawer (7), the storage compartment (8), the space to store (9) the chemical toilet (13), the shower drain (10), the shower space (11), the space to place (12) the chemical toilet (13) are visible; also being able to see the three airplane fabric walls (15), where one of said airplane fabric walls (15) includes the entrance door to the bathroom (14), one of the dampers (18), the door lock (17), and the drawbar (19).

FIGS. 1 to 12 show the deployment sequence of the bathroom module to demonstrate step by step, from its resting position (FIG. 1, folded and ready to travel) to FIG. 12 showing the bathroom module fully unfolded, ready for use, with each component numbered for reference purposes. FIGS. 13, 14, 15 and 16 show in detail the under-counter cabinet that is slidable towards the inside of the mini camper.

Figure 1:
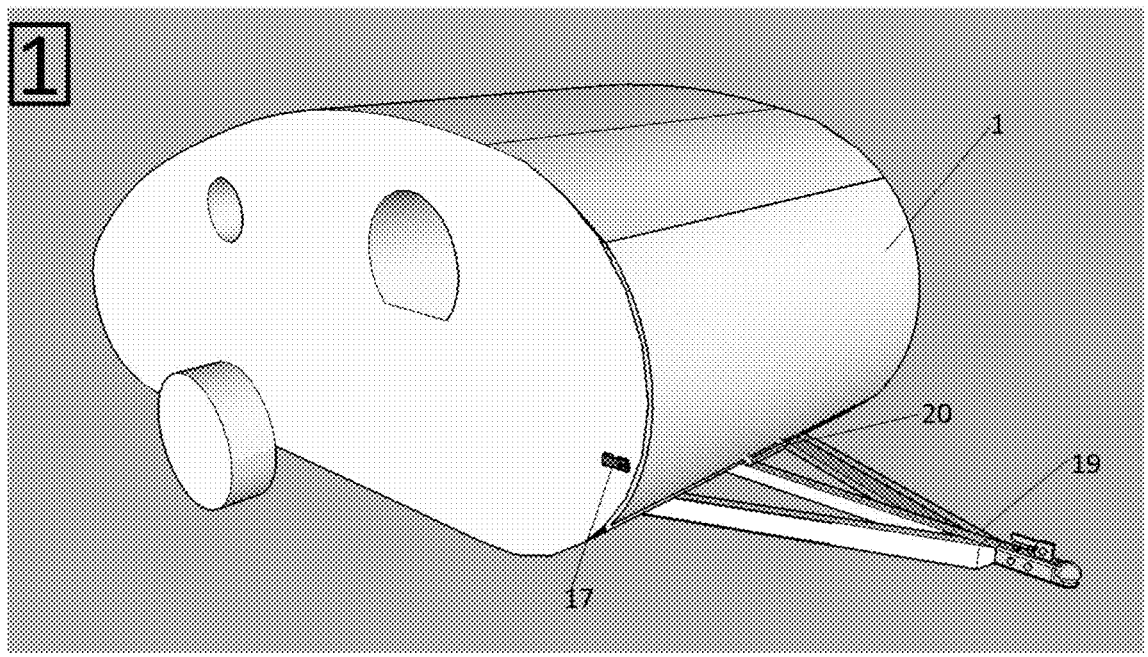
FIG. 1: ¾ figure front view of a teardrop mini camper with the front door (1) in folded position, ready to travel, the door handle (20) of said door, the door lock (17), and the drawbar (19).

Structure of the Mini Camper with Built-In Bathroom Module:

FIG. 1 depicts a ¾ front view of the teardrop mini camper, with the front door (1) in folded position, ready to travel. The door handle (20) of said front door (1), the door lock (17), and the drawbar (19). In this position there are no changes with respect to mini campers with no built-in bathrooms, since they measure from 1.20 m to 1.70 m high from the ground, having no possibility of incorporating a bathroom in their structure if it is not a fold-down bathroom.

Figure 2:
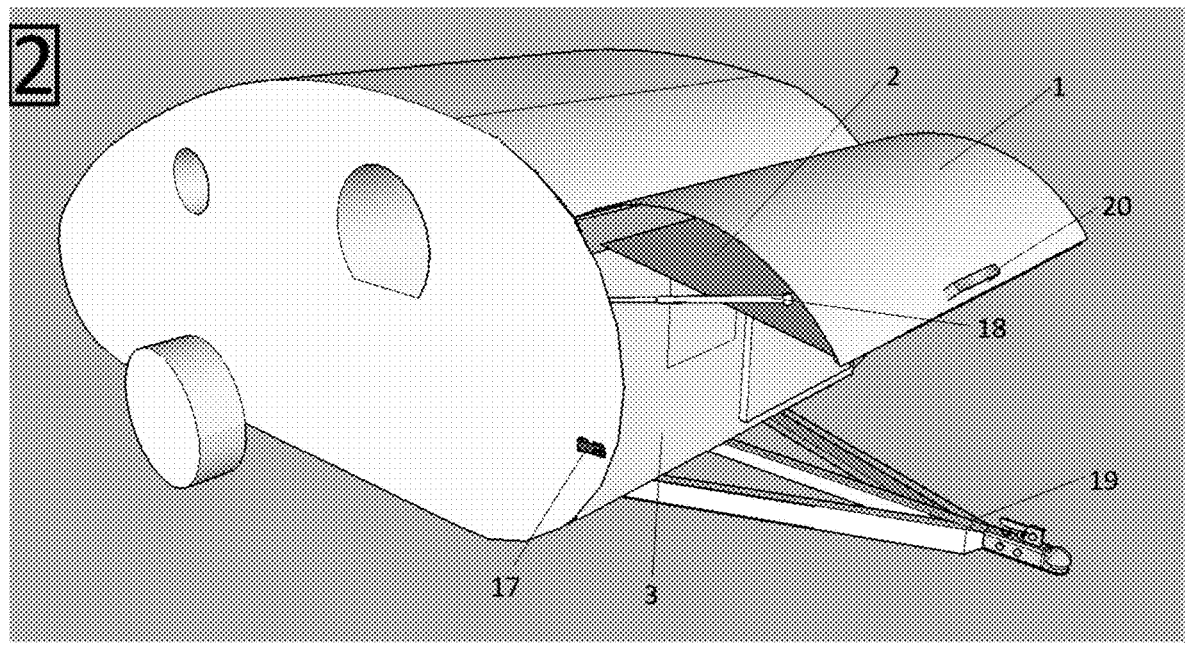
FIG. 2: view of the door handle (20), the front door (1) halfway unfolded next to the bathroom roof (2), which is in the folded position, and the bathroom floor (3), also folded, one of the dampers (18), the drawbar (19) and the door lock (17).

FIG. 2 depicts in detail the front door (1) in a halfway opened position, opened by means of the door handle (20). It also depicts the roof of the bathroom (2) in the folded position and the floor of the bathroom (3) also in the folded position; one of the dampers (18), the drawbar (19) and the lock (17) of the front door (1) are also visible.

Figure 3:
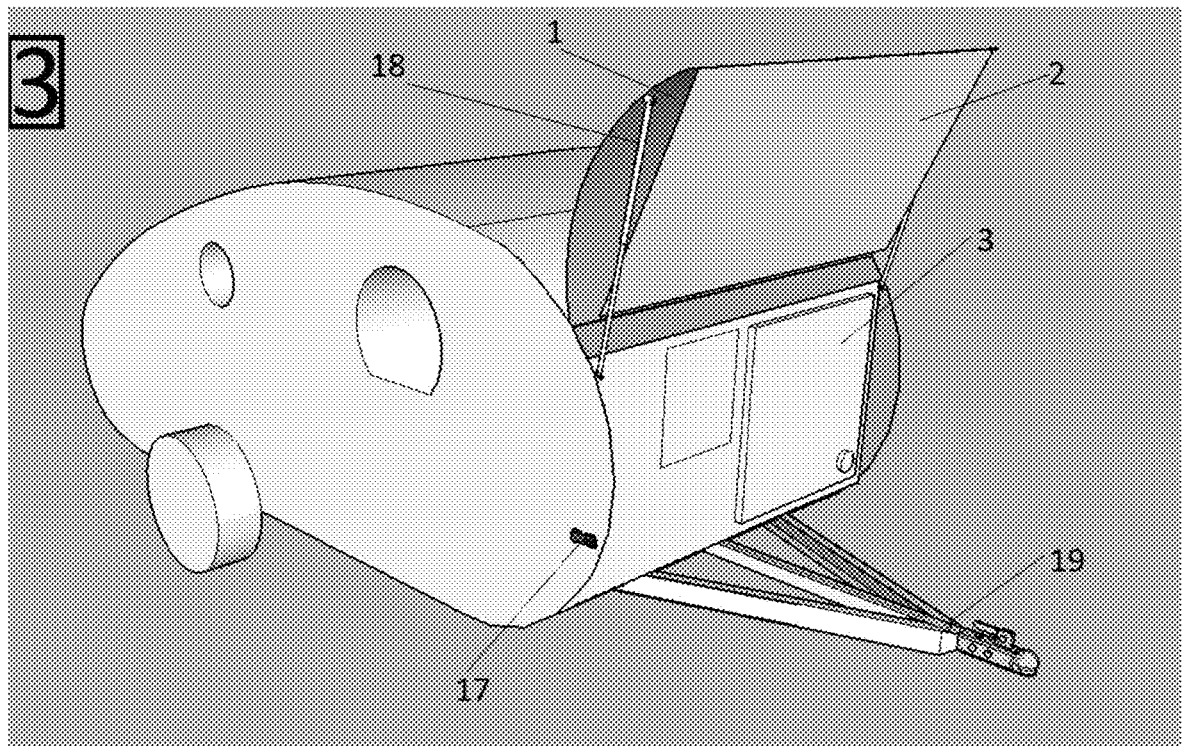
FIG. 3: view of the front door (1) completely unfolded, the bathroom roof (2) and the bathroom floor (3), still folded, one of the dampers (18), the drawbar (19), and the door lock (17).

FIG. 3 depicts the front door (1) in a completely unfolded position, the bathroom roof (2) and the bathroom floor (3), still folded; it also depicts one of the dampers (18), the drawbar (19) and the lock (17) of the front door (1).

Figure 4:
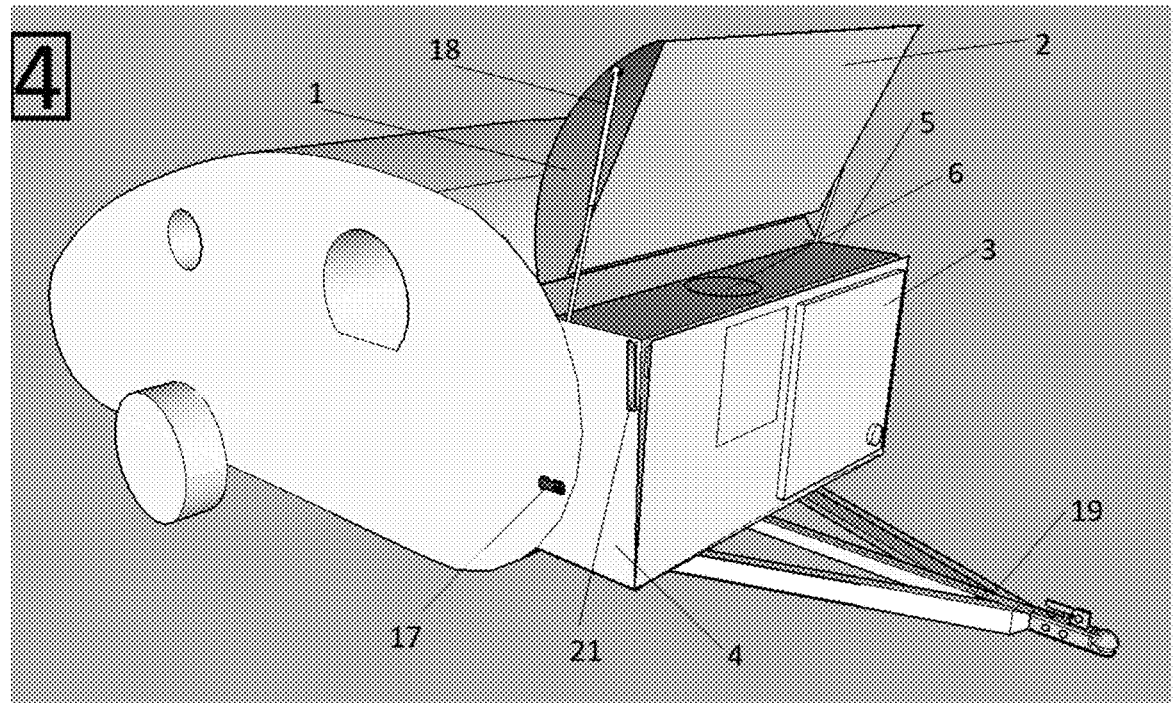
FIG. 4: view of the front door (1) completely unfolded, the bathroom roof (2) and the bathroom floor (3), still folded, the under-counter cabinet (4), the under-counter cabinet handle (21), the countertop (5) and the sink (6), one of the dampers (18), the drawbar (19), and the door lock (17).

FIG. 4 depicts the front door (1) in a completely unfolded position, the bathroom roof (2) and the bathroom floor (3) in a folded position. In this configuration, the under-counter cabinet (4) slides on rails (not shown) out of the mini camper's cabin using the under-counter cabinet handle (21) thus being visible in the exterior front part of the mini camper, together with the countertop (5) and the sink (6); one of the dampers (18) the drawbar (19) and the lock (17) of the front door (1) are also shown.

Figure 5:
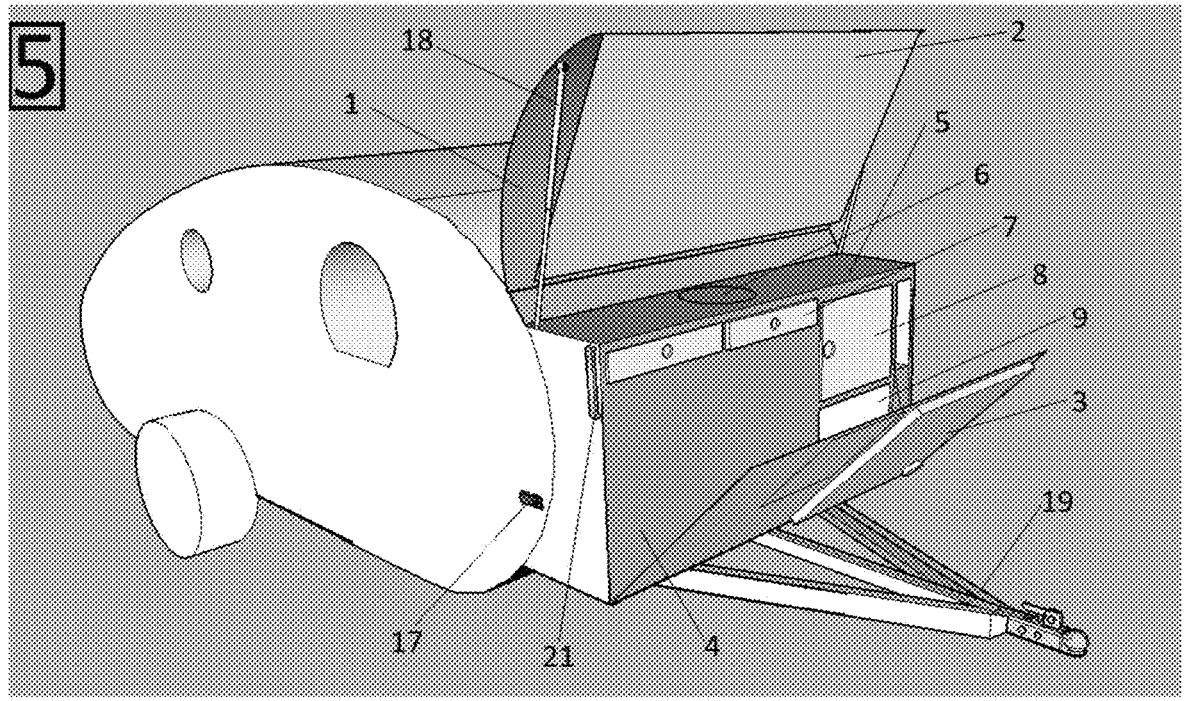
FIG. 5: view of the front door (1) completely unfolded, the bathroom roof (2) folded, the bathroom floor (3) halfway unfolded, the under-counter cabinet (4) unfolded, and thus the countertop (5), the sink (6), the storage drawer (7) and the storage compartment (8), the storage space (9) for the chemical toilet (13), the under-counter cabinet handle (21), one of the dampers (18), the drawbar (19) and the door lock (17), are visible.

FIG. 5 depicts the front door (1) in a completely unfolded position, the bathroom roof (2) in folded position, the bathroom floor (3) halfway unfolded, while the under-counter cabinet (4) in an unfolded position, being the countertop (5), the sink (6), the storage drawer (7), the storage compartment (8), and the storage space (9) for the chemical toilet (13) in sight. It also depicts the under-counter handle (21), one of the dampers (18), the drawbar (19) and the lock (17) of the front door (1).

Figure 6:
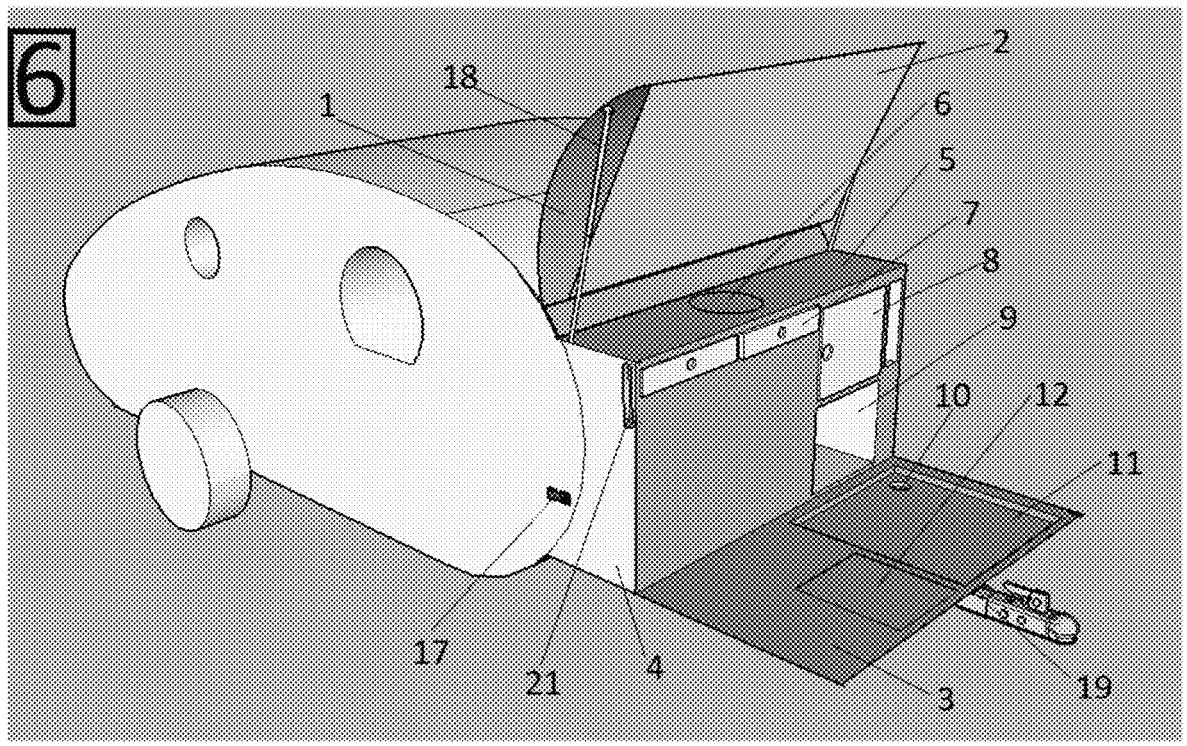
FIG. 6: view of the front door (1) completely unfolded, the bathroom roof (2) folded, the bathroom floor (3) completely unfolded, the under-counter cabinet (4) also completely unfolded, and thus the countertop (5), the sink (6), the storage drawer (7), the storage compartment (8), the storage space (9) for the chemical toilet (13), the shower drain (10), the shower space (11), the space to place (12) the chemical toilet (13), the under-counter cabinet handle (21), one of the dampers (18), the drawbar (19) and the door lock (17), are visible.

FIG. 6 depicts the front door (1) completely unfolded, the bathroom roof (2) in a folded position, the bathroom floor (3) completely unfolded, the under-counter cabinet (4) also completely unfolded; and the countertop (5), the sink (6), the storage drawer (7), the storage compartment (8), the storage space (9) for the chemical toilet (13), the shower drain (10), the shower space (11), and the space to place (12) the chemical toilet (13) being visible. It also depicts the under-counter handle (21), one of the dampers (18), the drawbar (19) and the lock (17) of the front door (1).

Figure 7:
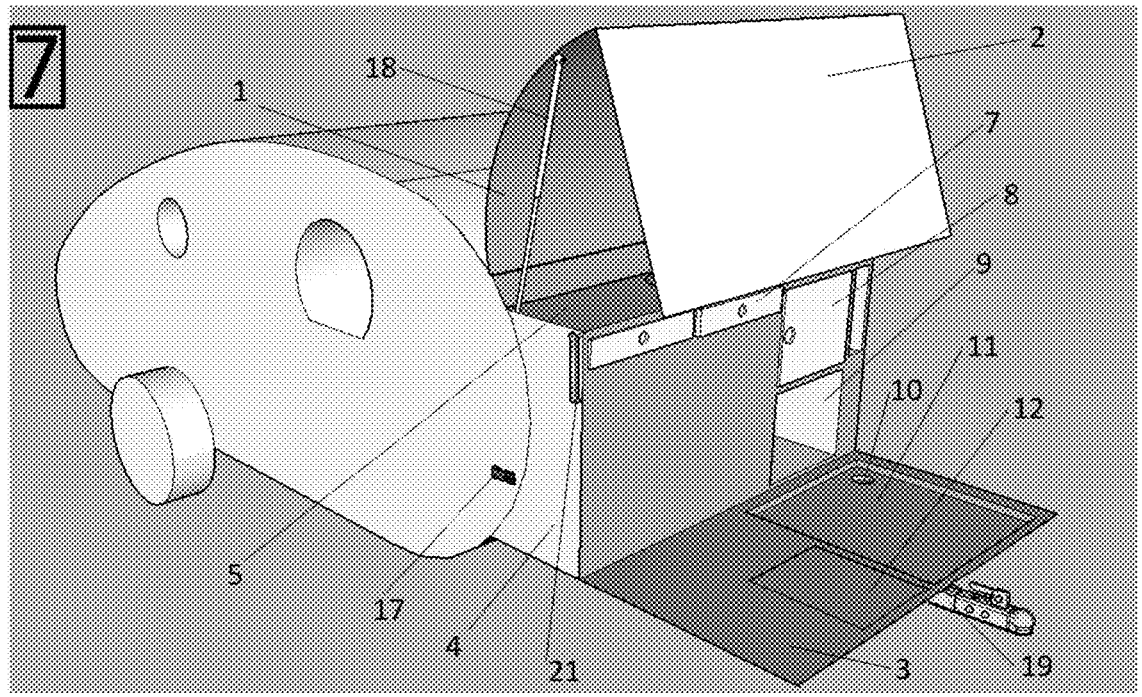
FIG. 7: view of the front door (1) completely unfolded, the bathroom roof (2) halfway unfolded, the bathroom floor (3) completely unfolded, the under-counter cabinet (4) also completely unfolded, and thus the countertop (5), the storage drawer (7), the storage compartment (8), the storage space (9) for the chemical toilet (13), the shower drain (10), the shower space (11), the space to place (12) the chemical toilet (13), the under-counter cabinet handle (21), one of the dampers (18), the drawbar (19) and the door lock (17), are visible.

FIG. 7 depicts the front door (1) in a completely unfolded position, the bathroom roof (2) halfway unfolded, the bathroom floor (3) completely unfolded, the under-counter cabinet (4) also completely unfolded; and the countertop (5), the storage drawer (7), the storage compartment (8), the storage space (9) for the chemical toilet (13), the shower drain (10), the shower space (11), and the space to place (12) the chemical toilet (13) being visible. It also depicts the under-counter handle (21), one of the dampers (18), the drawbar (19) and the lock (17) of the front door (1).

Figure 8:
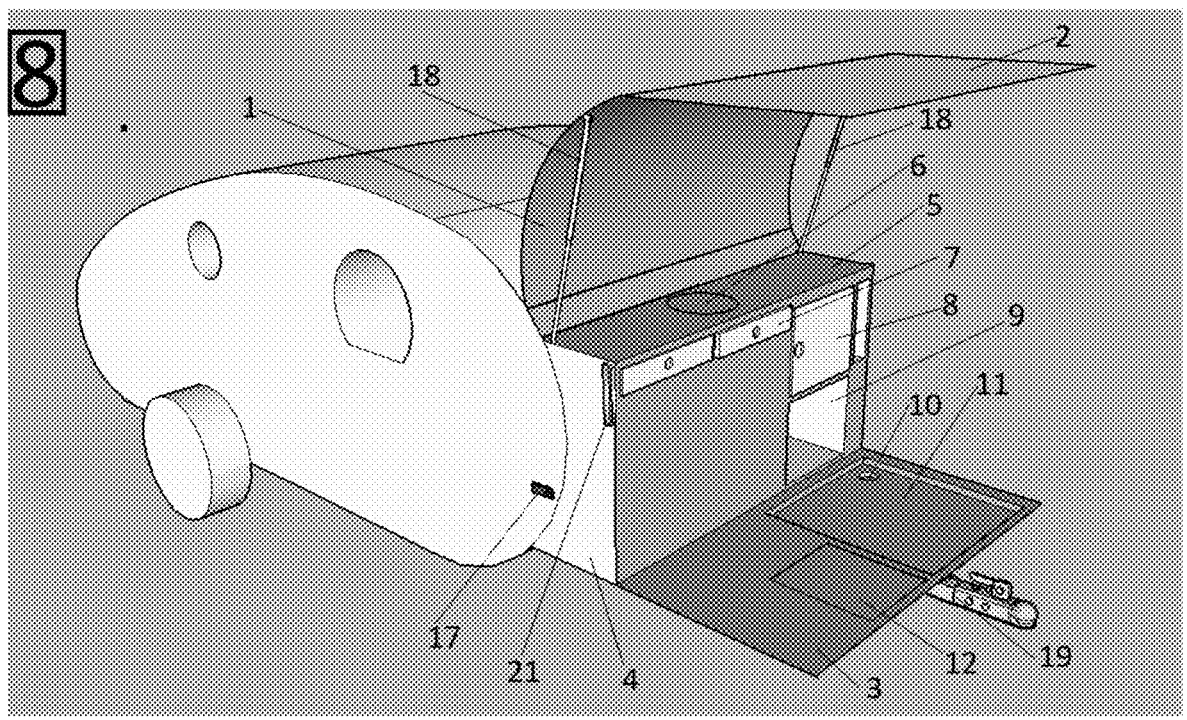
FIG. 8: view of the front door (1) completely unfolded, the bathroom roof (2) completely unfolded, the bathroom floor (3) completely unfolded, the under-counter cabinet (4) also completely unfolded, and thus the countertop (5), the sink (6), the storage drawer (7), the storage compartment (8), the storage space (9) for the chemical toilet (13), the shower drain (10), the shower space (11), the space to place (12) the chemical toilet (13), the under-counter cabinet handle (21), one of the dampers (18), the drawbar (19) and the door lock (17), are visible.

FIG. 8 depicts the front door (1) completely unfolded, the bathroom roof (2) completely unfolded, the bathroom floor (3) completely unfolded, the under-counter cabinet (4) also completely unfolded; and the countertop (5), the sink (6), the storage drawer (7), the storage compartment (8), the storage space (9) for the chemical toilet (13), the shower drain (10), the shower space (11), and the space to place (12) the chemical toilet (13) being visible. It also depicts the under-counter handle (21), the dampers (18), the drawbar (19) and the lock (17) of the front door (1).

Figure 9:
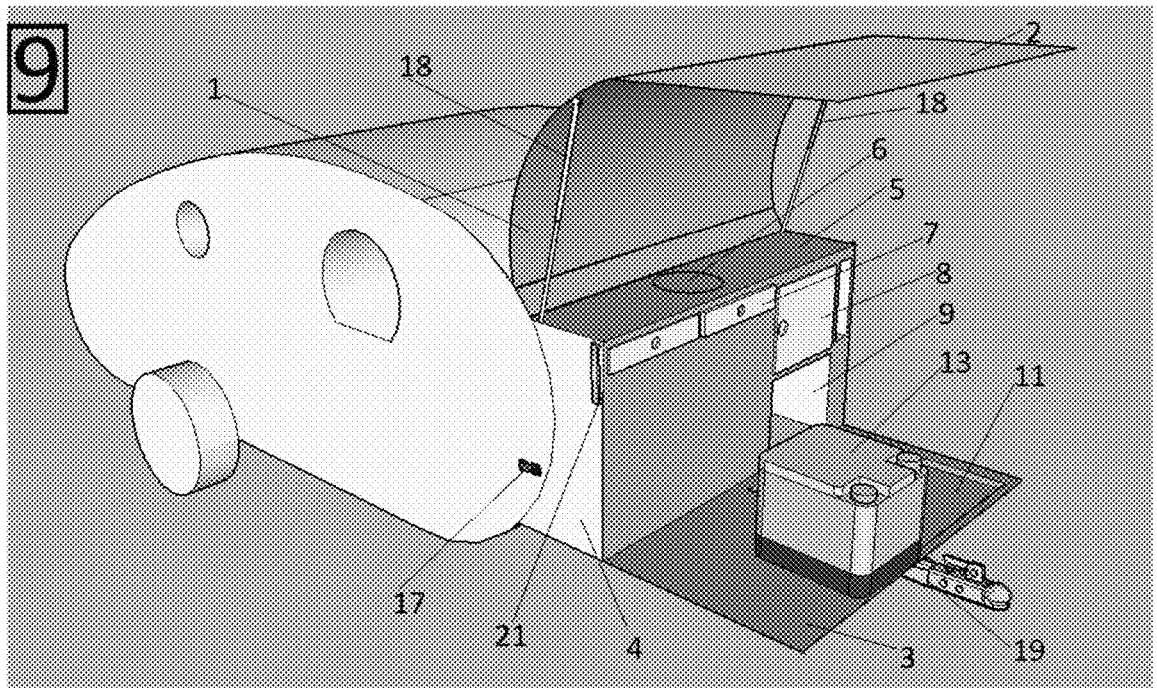
FIG. 9: view of the front door (1) completely unfolded, the bathroom roof (2) completely unfolded, the bathroom floor (3) completely unfolded, the under-counter cabinet (4) also completely unfolded, and thus the countertop (5), the sink (6), the storage drawer (7), the storage compartment (8), the storage space (9) for the chemical toilet (13), the shower drain (11), the shower space (11), the chemical toilet (13) duly placed in the space for its use (12), the under-counter cabinet handle (21), one of the dampers (18), the drawbar (19) and the door lock (17), are visible.

FIG. 9 depicts the front door (1) completely unfolded, the bathroom roof (2) completely unfolded, the bathroom floor (3) completely unfolded, the under-counter cabinet (4) also completely unfolded; and the countertop (5), the sink (6), the storage drawer (7), the storage compartment (8), the storage space (9) for the chemical toilet (13), the shower space (11), the chemical toilet (13) duly placed in the space for its use (12) being visible, as well as the under-counter cabinet handle (21), the dampers (18), the drawbar (19) and the lock (17) of the front door (1).

FIG. 10 depicts, from another perspective, the front door (1) completely unfolded, the bathroom roof (2) completely unfolded, the bathroom floor (3) completely unfolded, the under-counter cabinet (4) also completely unfolded; and the countertop (5), the sink (6), the storage drawer (7), the storage compartment (8), the storage space (9) for the chemical toilet (13), the shower space (11), the chemical toilet (13) duly placed in the space for its use (12) being visible, as well as the under-counter cabinet handle (21), the damper (18), the drawbar (19) and the lock (17) of the front door (1). Additionally, an individual is represented at scale in the bathroom to give a better idea of spaces and dimensions.

FIG. 11 depicts the front door (1) completely unfolded, the bathroom roof (2) completely unfolded, the bathroom floor (3) completely unfolded, the under-counter cabinet (4) also completely unfolded; and the countertop (5), the sink (6), the storage drawer (7), the storage compartment (8), the storage space (9) for the chemical toilet (13), the shower drain (10), the shower space (11), and the space to place (12) the chemical toilet (13) being visible; as well as the airplane fabric walls (15), wherein the entrance door to the bathroom (14) is included. This Figure also depicts the bathroom roof supports (22) already installed to be able to hold the roof in its unfolded position. The dampers (18) and drawbar (19) may also be seen.

FIG. 12 depicts an exterior perspective of the fully unfolded bathroom, being able to see the front door (1), the bathroom roof (2), the bathroom floor (3), the under-counter cabinet (4); and thus the countertop (5), the sink (6), the storage drawer (7), the storage compartment (8), the space to store (9) the chemical toilet (13), the shower drain (10), the shower space (11), the space to place (12) the chemical toilet (13) being visible; as well as the airplane fabric walls (15), which include the entrance door to the bathroom (14), one of the dampers (18), the door lock (17) and the drawbar (19).

Figure 13:
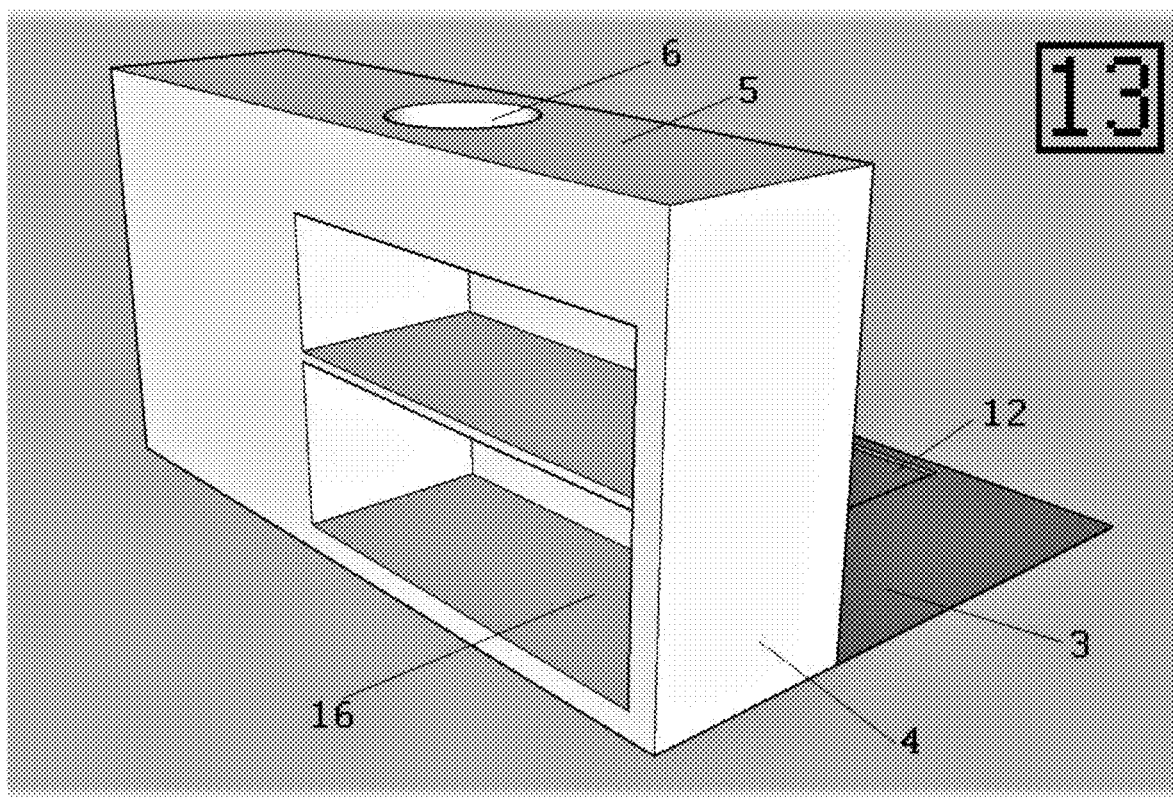
FIG. 13: view of the under-counter cabinet (4) from a different perspective (its rear part inside the mini camper's cabin), being the bedroom closet space (16) are visible, being also present the countertop (5), the sink (6), the bathroom floor (3), and the space to place the chemical toilet (12).

FIG. 13 depicts the under-counter cabinet (4) from a different perspective (its rear part inside the mini camper's cabin), being visible the bedroom closet space (16), and being also present the countertop (5), the sink (6), the bathroom floor (3), and the space to place the chemical toilet (12).

Figure 14:
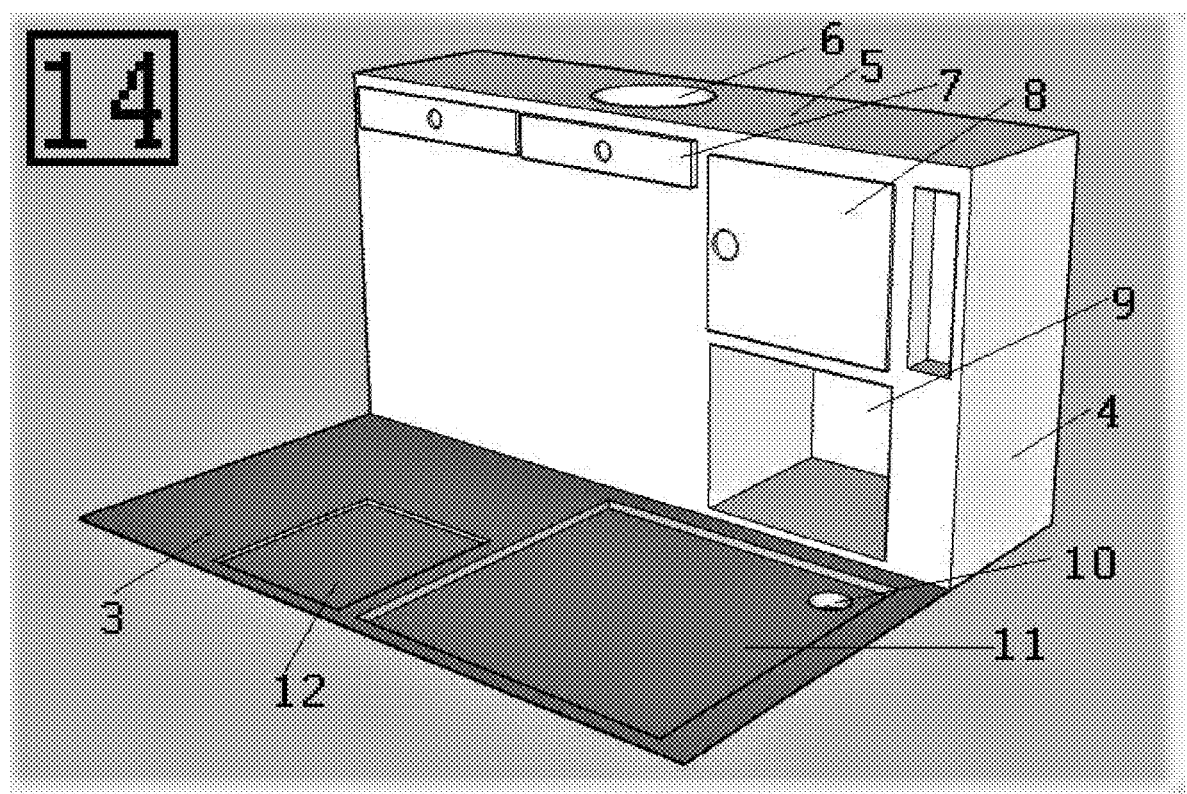
FIGS. 14, 15 and 16: view of the under-counter cabinet (4) from inside the bathroom and with the bathroom floor (3) in its sequence of opening and closing, with the countertop (5), the sink (6), the storage drawer (7), the storage compartment (8), the storage space (9) for the chemical toilet (13), the shower drain (10), the shower space (11) and the space to place (12) the chemical toilet (13) in sight.
Figure 15:
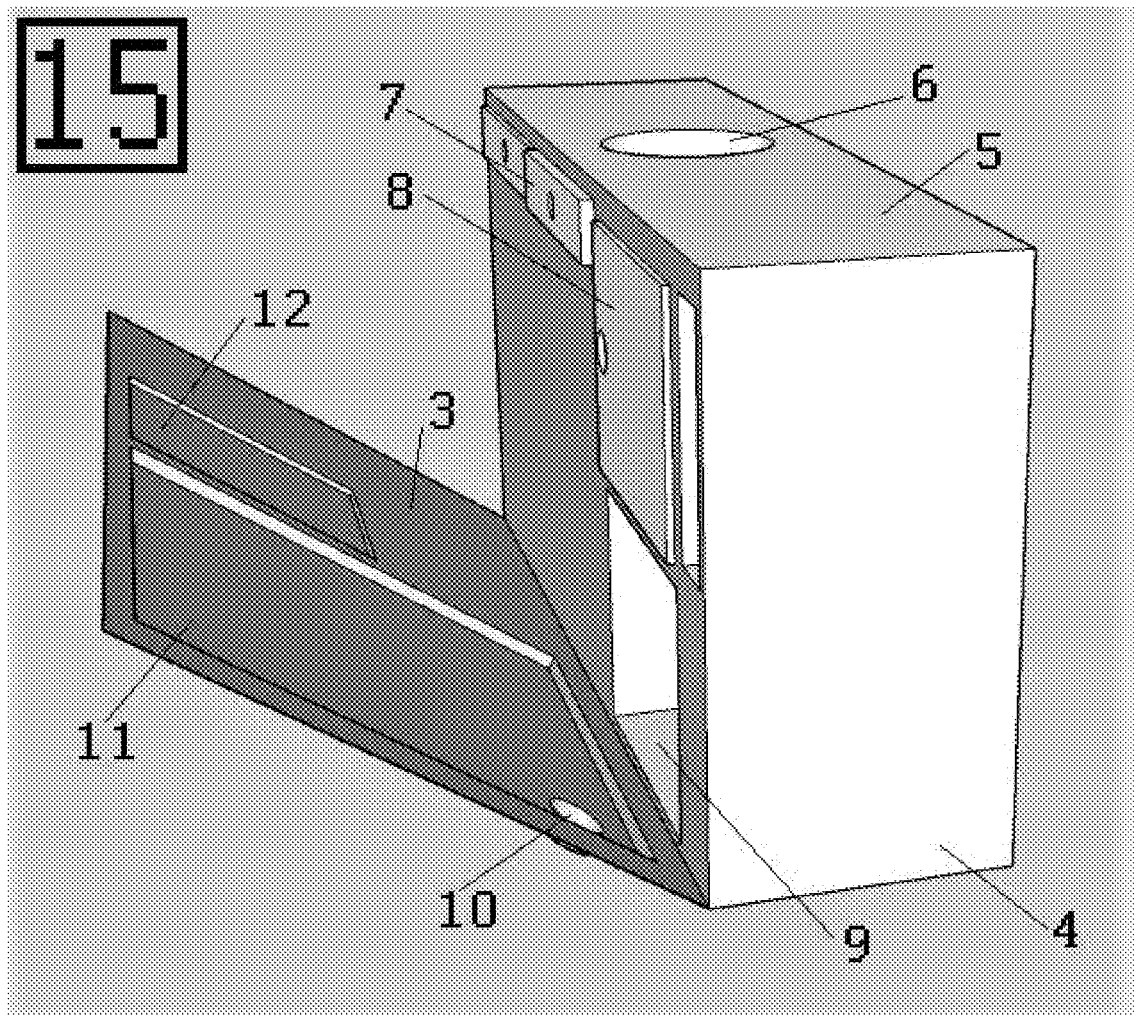
Figure 16:
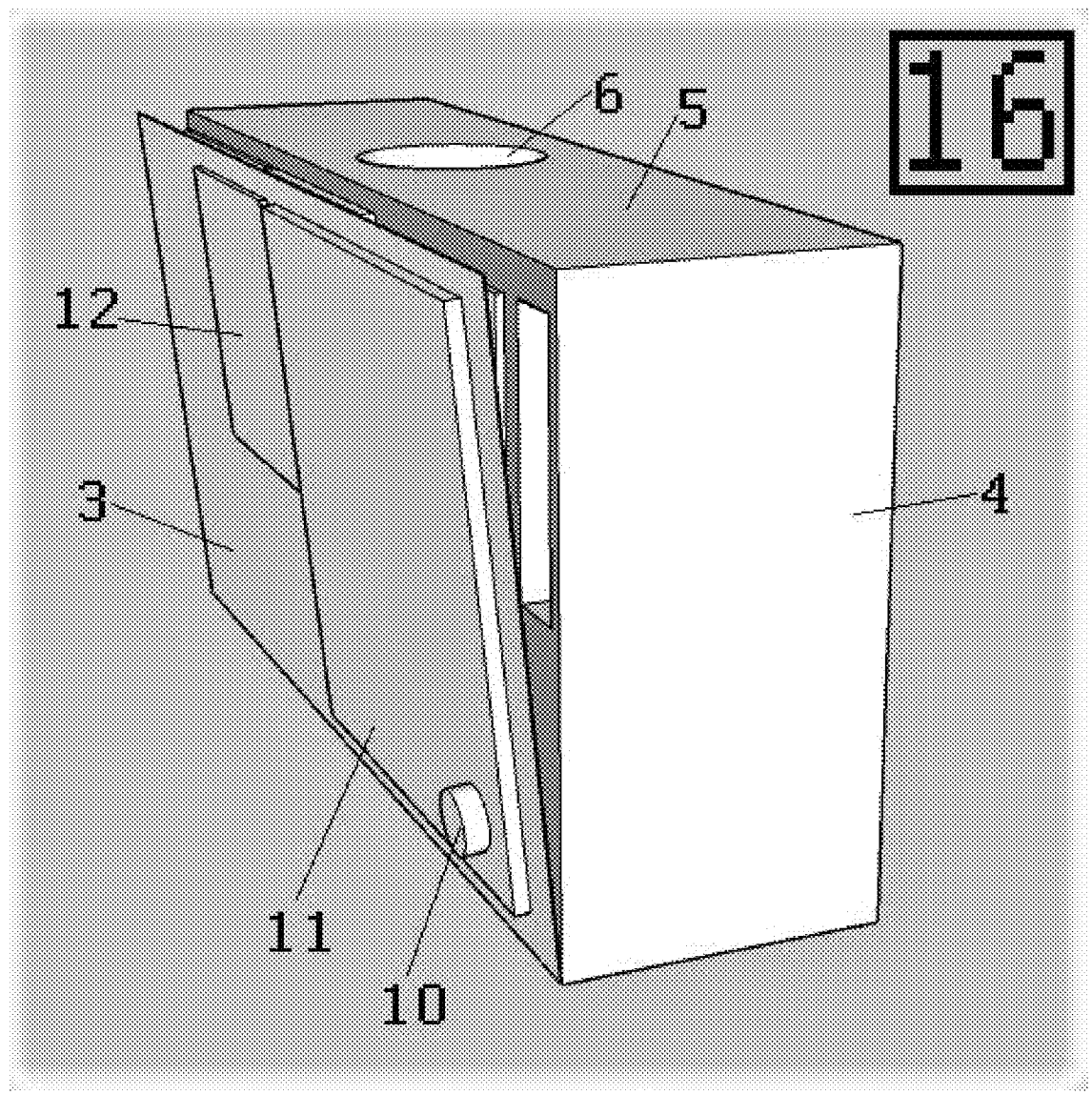

FIGS. 14, 15 and 16 depict the under-counter cabinet (4) from a perspective from inside the bathroom and with the bathroom floor (3) in its sequence of opening and closing, with the countertop (5), the sink (6), the storage drawer (7), the storage compartment (8), the storage space for the chemical toilet (9), the shower drain (10), the shower space (11), and the space to place the chemical toilet (12) in sight.

Bathroom module assembly procedure: When starting to assemble the bathroom module, the person must be positioned in front of the camper's front door (1) on the drawbar (19). This front door (1) is also the access door to the bathroom module, so in its lower central part there is a handle (20) which is used to lift the front door (1) on which the person will be positioned. When the handle (20) is pulled, the front door (1) is raised to a 180-degree angle. Said front door (1), once converted into the front wall of the bathroom module, will be supported by the dampers (18) that are held to the inner face of the wall at one end and to a fixed point on the camper's cabin by means of a piano hinge, at the other end. On the inner face of this front wall (1), fastened at the opposite end to the end pivoting with the camper, there is a part which serves as bathroom roof (2) when unfolded. This part serving as bathroom roof (2) is deployed at 90 degrees with respect to the front door (1), being horizontal to the floor, fastened to the front wall by means of a piano hinge.

Secondly, and after having unfolded the front door (1), a smooth wall appears of the size of the mini camper's interior and about 80 cm high. This smooth wall is the bottom face of the bathroom floor (3) folded in its resting position and, in its unfolded position, it will be positioned over the mini camper's drawbar (19). Behind this part, there is the bathroom under-counter cabinet (4), having the same width and height as the bathroom floor (3) described above. This cabinet has an under-counter handle (21) so that it may be removed from inside the mini camper thanks to its sliding on rails. Once outside, it is fixed with bolts to stay in this position, which allows to deploy the bathroom floor (3) pivoting in its lower front angle by means of a piano hinge, unfolded over the mini camper's drawbar (19).

The bathroom floor (3) has a shower space (11) with adapted anti-slip floor and an inclination towards the drain (10), which, in turn, is connected to a gray water tank under the mini camper chassis. The bathroom floor (3) also has another space to place (12) the chemical toilet (13) when the bathroom module is deployed.

The under-counter cabinet (4) has a space to store a chemical toilet (9) when the bathroom module is folded; in its upper part it has a countertop (5) with a sink (6), and its front part has storage drawers (7) and a space to place the chemical toilet (12). On its back it has a storage compartment (16) as it is facing the inside of the camper. It also includes inside a space to install a gas water heater that may be used both in the sink (6) and in the shower.

Thirdly, the bathroom roof (2) is deployed, which is fastened to the front door (1), making an angle with said front door (1) at its upper vertex by means of a piano hinge. When lifting the bathroom roof (2), the module is physically assembled. The bathroom roof (2) is supported with 2 recessed support points at each front end that are placed directly to the floor of the bathroom module (3).

Additionally, the bathroom module (3) has exterior walls of airplane fabric (15) so as to achieve the necessary privacy. These airplane fabric walls (15) are tied in four parts of the module: the front door (1), the bathroom roof (2), the under-counter cabinet (4), and the floor of said bathroom module (3). They are fastened with baguettes and rivets throughout their perimeter. Furthermore, the airplane fabric walls (15) have, on one of their sides, an entrance door (14) with a zipper, identical to that of a camping tent.

The materials used to build the under-counter cabinet (4) are the ones commonly used, such as melamine MDF in all its structure, and it may include some GRP parts (fiberglass reinforced plastic) to improve its weight, and pipes and lights that are conventionally installed, taking into account the moving parts due to the nature of the sliding cabinet.

Both the bathroom floor (3) and the bathroom roof (2), along with the front door (1) that is unfolded from the mini camper to make way for the cabinet, are built-in pre-molded fiberglass, adjusted to the mini camper's aesthetics. Airplane fabric walls (15) are custom made.

EXAMPLE OF AN EMBODIMENT

As an example, teardrop campers including the features of this utility model are characterized by having spaces ranging from (1 m) to (1.8 m) wide and (2 m) to (3.5 m) in length and a height from (1.2 m) to (1.8 m). Wheels and tires are outside the body of these vehicles and are protected by fenders. Their weight range is from 300 to 700 kg.

The invention claimed is:

1. A mini camper having a built-in folding front door, where said front door unfolds a bathroom module over a drawbar, wherein the bathroom module comprises: a bathroom roof fastened to the front door by a plurality of piano hinges and at an angle with said front door at its upper vertex by the piano hinges, wherein said bathroom roof is supported with two recessed support points at each front end; outer walls made of waterproof cloth, wherein said outer walls are fastened both to the front door and to the bathroom roof, to an under-counter cabinet, and to a floor of the bathroom module by profiles and rivets, and wherein said waterproof cloth walls comprise an entrance door with a zipper on one of its sides: said under-counter cabinet having a door handle and rails, where said under-counter cabinet has a space configured to place a chemical toilet, a countertop with a sink in its upper part, a plurality of storage drawers and a space to store said chemical toilet and a storage compartment in its front face; said bathroom floor that has a shower space with an adapted anti-slip floor and inclination towards a shower drain and a space configured to place the chemical toilet.

2. A method of assembling a mini camper according to claim 1, wherein for an assembly procedure, first, a person must be positioned in front of the front door of the camper, on the drawbar, and must pull a door handle to lift the front door and form a 180 degree angle; secondly, and after unfolding the front door, a smooth wall appears and is configured to occupy the size of the mini camper's interior width and has a height of approximately 80 cm, where said smooth wall is said bathroom floor; behind said bathroom floor there is said under-counter cabinet with said door handle; said under-counter cabinet is fixed with bolts to stay in an open position and allows the unfolding of the bathroom floor, which pivots at its lower front angle by a piano hinge, on the mini camper's drawbar; thirdly, said bathroom roof is unfolded, which is fastened to the front door, making an angle with said front door at its upper vertex by hinges; and the bathroom roof is lifted, and the bathroom floor fits through brackets of the bathroom roof.

3. The bathroom module of claim 1, wherein the bathroom module may be assembled with materials selected from wood, fiberglass, or iron structure and plates.

4. The under-counter cabinet of claim 1, wherein the bathroom module structure is made of melamine MDF and the countertop is made of fiberglass reinforced plastic (GRP).

5. The front door and the bathroom roof of claim 1, wherein the front door and the bathroom roof are built of pre-molded fiberglass.

* * * * *